(12) United States Patent
Sawada et al.

(10) Patent No.: US 9,164,210 B2
(45) Date of Patent: Oct. 20, 2015

(54) OPTICAL LAMINATED BODY, OPTICAL LAMINATED BODY SET, AND LIQUID CRYSTAL PANEL USING OPTICAL LAMINATED BODY OR OPTICAL LAMINATED BODY SET

(75) Inventors: Hiroaki Sawada, Ibaraki (JP); Tatsuya Araki, Ibaraki (JP); Seiji Kondo, Ibaraki (JP); Minoru Miyatake, Ibaraki (JP)

(73) Assignee: NITTO DENKO CORPORATION, Ibaraki-shi (JP)

(*) Notice: Subject to any disclaimer, the term of this patent is extended or adjusted under 35 U.S.C. 154(b) by 30 days.

(21) Appl. No.: 14/130,211

(22) PCT Filed: Jul. 25, 2012

(86) PCT No.: PCT/JP2012/068791
§ 371 (c)(1),
(2), (4) Date: Dec. 30, 2013

(87) PCT Pub. No.: WO2013/021818
PCT Pub. Date: Feb. 14, 2013

(65) Prior Publication Data
US 2014/0125925 A1    May 8, 2014

(30) Foreign Application Priority Data
Aug. 5, 2011   (JP) .................................. 2011-171901

(51) Int. Cl.
*G02B 5/30* (2006.01)
*G02F 1/1335* (2006.01)

(52) U.S. Cl.
CPC .............. *G02B 5/3041* (2013.01); *G02B 5/305* (2013.01); *G02F 1/133536* (2013.01); *G02F 2201/54* (2013.01)

(58) Field of Classification Search
CPC  B32B 27/00; B32B 2307/42; B32B 2457/20; B32B 2457/202; B32B 37/12; G02F 1/133536; G02F 1/133528; G02F 1/1333; G02F 1/1335; G02F 1/13; G02F 1/133634; G02F 1/13363; G02F 1/133553; G02F 2413/08; G02F 2001/133562; G02B 1/115; G02B 5/30; G02B 5/3025; G02B 5/3041; G02B 5/32; B29D 11/0073
USPC ............ 349/96, 122, 62; 359/485.01, 485.03, 359/485.05, 489.01, 537; 156/60, 249, 156/275.7; 428/1.1, 1.3, 1.31
See application file for complete search history.

(56) References Cited

U.S. PATENT DOCUMENTS 6,816,217 B2   11/2004   Sone
7,110,177 B2    9/2006   Sugino et al.
(Continued)

FOREIGN PATENT DOCUMENTS

CN        1434333 A       8/2003
JP      2001-215333 A     8/2001
(Continued)

OTHER PUBLICATIONS

International Search Report, dated Aug. 28, 2012, issued in corresponding application No. PCT/JP2012/068791.
(Continued)

*Primary Examiner* — Thoi Duong
(74) *Attorney, Agent, or Firm* — Westerman, Hattori, Daniels & Adrian, LLP

(57) ABSTRACT

There is provided an optical laminate that significantly suppresses the warping of a liquid crystal panel and can realize high contrast. An optical laminate of the present invention includes: a polarizing film having a thickness of 10 μm or less; and a reflective polarization film. A liquid crystal panel of the present invention includes: a liquid crystal cell; and the optical laminate of the present invention. According to another aspect of the present invention, an optical laminate set is provided. The optical laminate set includes: a first optical laminate that is the optical laminate of the present invention as described above; and a second optical laminate including a polarizing film having a thickness larger than the thickness of the polarizing film of the first optical laminate by 5 μm or more.

15 Claims, 2 Drawing Sheets

(56) References Cited

U.S. PATENT DOCUMENTS

| | | |
|---|---|---|
| 7,812,902 B2 | 10/2010 | Kiya et al. |
| 8,314,987 B2 | 11/2012 | Goto et al. |
| 8,320,042 B2 | 11/2012 | Goto et al. |
| 8,379,169 B2 | 2/2013 | Kitagawa et al. |
| 8,411,360 B2 | 4/2013 | Kitagawa et al. |
| 8,520,169 B2 | 8/2013 | Kitagawa et al. |
| 8,520,171 B2 | 8/2013 | Kitagawa et al. |
| 8,638,411 B2 | 1/2014 | Park et al. |
| 2001/0022997 A1 | 9/2001 | Honda et al. |
| 2003/0137732 A1 | 7/2003 | Sugino et al. |
| 2003/0147030 A1 | 8/2003 | Sone |
| 2004/0189907 A1* | 9/2004 | Tominaga et al. ............ 349/115 |
| 2007/0264447 A1 | 11/2007 | Oya et al. |
| 2010/0157205 A1 | 6/2010 | Kiya et al. |
| 2010/0157426 A1 | 6/2010 | Matsunami et al. |
| 2011/0299010 A1 | 12/2011 | Park et al. |
| 2012/0055607 A1 | 3/2012 | Kitagawa et al. |
| 2012/0055608 A1 | 3/2012 | Kitagawa et al. |
| 2012/0055621 A1 | 3/2012 | Goto et al. |
| 2012/0055622 A1 | 3/2012 | Kitagawa et al. |
| 2012/0055623 A1 | 3/2012 | Kitagawa et al. |
| 2012/0056211 A1 | 3/2012 | Kitagawa et al. |
| 2012/0056340 A1 | 3/2012 | Kitagawa et al. |
| 2012/0057104 A1 | 3/2012 | Kitagawa et al. |
| 2012/0057107 A1 | 3/2012 | Kitagawa et al. |
| 2012/0057231 A1 | 3/2012 | Goto et al. |
| 2012/0057232 A1 | 3/2012 | Goto et al. |
| 2012/0058291 A1 | 3/2012 | Kitagawa et al. |
| 2012/0058321 A1 | 3/2012 | Goto et al. |
| 2013/0100529 A1 | 4/2013 | Kitagawa et al. |
| 2013/0114139 A1 | 5/2013 | Kitagawa et al. |

FOREIGN PATENT DOCUMENTS

| | | |
|---|---|---|
| JP | 2003-149438 A | 5/2003 |
| JP | 2003-279748 A | 10/2003 |
| JP | 2006-062281 A | 3/2006 |
| JP | 2007-292966 A | 11/2007 |
| JP | 2010-020211 A | 1/2010 |
| JP | 2010-145866 A | 7/2010 |
| JP | 2010-204502 A | 9/2010 |
| JP | 4691205 B1 | 6/2011 |
| TW | 201120527 A1 | 6/2011 |

OTHER PUBLICATIONS

Extended European Search Report dated Feb. 4, 2015, issued in corresponding European Patent Application No. 12821906.0, (6 pages).

Office Action dated Apr. 21, 2015, issued in counterpart Chinese Patent Application No. 201280038201.X, with English translation (13 pages).

Office Action dated May 20, 2015, issued in counterpart Japanese Patent Application No. 2011-171901, with English translation (6 pages).

* cited by examiner

OPTICAL LAMINATED BODY, OPTICAL LAMINATED BODY SET, AND LIQUID CRYSTAL PANEL USING OPTICAL LAMINATED BODY OR OPTICAL LAMINATED BODY SET

TECHNICAL FIELD

The present invention relates to an optical laminate, an optical laminate set, and a liquid crystal panel using the optical laminate or the optical laminate set.

BACKGROUND ART

An increase in screen size of an image display apparatus typified by a liquid crystal display apparatus and the thinning of the apparatus have been progressing in recent years. The following problem arises in association with the increase in screen size and the thinning. The warping of a liquid crystal panel occurs, and as a result, display unevenness or light leakage occurs. To solve such problem, a technology involving adjusting the thickness of the protective layer of a polarizing film in each of optical laminates to be placed on both sides of a liquid crystal cell (Patent Literature 1) or a technology involving adjusting the moisture content of each of the optical laminates (Patent Literature 2) has been proposed. However, the technologies each still have large room for improvement in terms of the suppression of the warping of the liquid crystal panel.

CITATION LIST

Patent Literature

[PTL 1] JP 2003-149438 A
[PTL 2] JP 2007-292966 A

SUMMARY OF INVENTION

Technical Problem

The present invention has been made to solve the conventional problem and an object of the present invention is to provide an optical laminate that significantly suppresses the warping of a liquid crystal panel and can realize high contrast.

Solution to Problem

An optical laminate according to an embodiment of the present invention includes: a polarizing film having a thickness of 10 µm or less; and a reflective polarization film.

In one embodiment of the present invention, the polarizing film is obtained by transverse stretching.

According to another aspect of the present invention, an optical laminate set is provided. The optical laminate set includes: a first optical laminate that includes the optical laminate as described above; and a second optical laminate including a polarizing film having a thickness larger than the thickness of the polarizing film of the first optical laminate by 5 µm or more.

According to still another aspect of the present invention, a liquid crystal panel is provided. The liquid crystal panel includes: a liquid crystal cell; and the optical laminate as described above.

A liquid crystal panel according to another embodiment of the present invention includes: a liquid crystal cell; and the optical laminate set as described above. The second optical laminate is placed on a viewer side and the first optical laminate is placed on a side opposite to the viewer side.

Advantageous Effects of Invention

According to the present invention, two effects, i.e., the suppression of the warping of a liquid crystal panel and an improvement in contrast can be simultaneously realized by using the optical laminate having a thin polarizing film and a reflective polarization film. Further, the effects can be made additionally significant by using such optical laminate (first optical laminate) and the second optical laminate having a polarizing film thicker than the polarizing film of the first optical laminate as a set.

DESCRIPTION OF EMBODIMENTS

Hereinafter, preferred embodiments of the present invention are described with reference to the drawings. However, the present invention is not limited to these specific embodiments.

Figure 1:
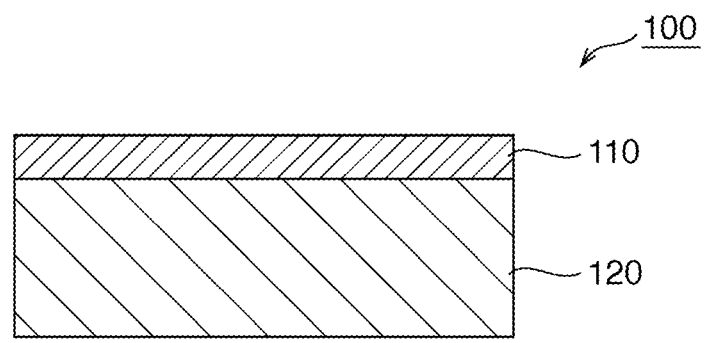
FIG. 1 is a schematic sectional view of an optical laminate according to one embodiment of the present invention.

A. Optical Laminate
A-1. Entire Construction of Optical Laminate
FIG. 1 is a schematic sectional view of an optical laminate according to one embodiment of the present invention. An optical laminate 100 has a polarizing film 110 and a reflective polarization film 120. The polarizing film 110 has a thickness of 10 µm or less. The polarizing film 110 and the reflective polarization film 120 may be laminated through any appropriate adhesion layer (specifically a pressure-sensitive adhesive layer or an adhesive layer), or may be laminated so as to be in close contact with each other (without through any adhesion layer). According to the present invention, such thin polarizing film and the reflective polarization film are laminated, and hence the warping of a liquid crystal panel can be suppressed. In addition, as described in detail later, such effect can be made additionally significant by using the optical laminate of the present invention (hereinafter sometimes referred to as "first optical laminate" when reference is made to an optical laminate set) and a second optical laminate having a polarizing film thicker than the polarizing film of the first optical laminate as a set. More specifically, when the optical laminate of the present invention (first optical laminate) is placed on a side opposite to the viewer side of a liquid crystal cell and the second optical laminate is placed on the viewer side of the liquid crystal cell, the warping of the liquid crystal panel is significantly suppressed, and as a result, display unevenness and light leakage can be prevented. Further, according to the present invention, the reflective polarization film is incorporated into the optical laminate and hence the utilization efficiency of backlight can be improved. In recent years, a reduction in price of a liquid crystal display apparatus has been progressing and the reduction has been leading to a reduction in luminance of the liquid crystal panel, but the optical laminate of the present invention can contribute to the suppression of such luminance reduction. That is, according to the optical laminate of the present invention, two effects, i.e., the suppression of the warping of the liquid crystal panel and the prevention of the luminance reduction can be simultaneously realized. Further, according to the optical laminate of the present invention, a liquid crystal panel having high contrast can be realized.

The transmission axis of the polarizing film 110 and the transmission axis of the reflective polarization film 120 can form any appropriate angle depending on purposes. It is preferred that the transmission axis of the polarizing film 110 and the transmission axis of the reflective polarization film 120 be substantially parallel to each other.

A-2. Polarizing Film

As described above, the thickness of the polarizing film 110 is 10 μm or less, preferably 7 μm or less, more preferably 5 μm or less. As described above, the optical laminate of the present invention in which such thin polarizing film and the reflective polarization film are laminated can suppress the warping of the liquid crystal panel. In particular, the warping of the liquid crystal panel can be significantly suppressed by using the optical laminate of the present invention (first optical laminate) and the second optical laminate having the polarizing film thicker than the polarizing film of the first optical laminate as a set. Meanwhile, the thickness is preferably 1 μm or more. When the thickness is less than 1 μm, sufficient optical characteristics may not be obtained. Further, according to the present invention, high contrast can be maintained while the warping of the liquid crystal panel is suppressed by using an extremely thin polarizing film. In general, as the thickness of a polarizing film reduces, its optical characteristics tend to reduce. According to the present invention, however, the thin polarizing film is integrated with the reflective polarization film, and hence an excellent effect, i.e., the suppression of the warping of the liquid crystal panel by the thinning of the polarizing film is realized and reductions in optical characteristics of the polarizing film due to the thinning can be covered. Compatibility between such effects is particularly significant when the optical laminate of the present invention is used on the side opposite to the viewer side of the liquid crystal panel. This is because the reflective polarization film improves the utilization efficiency of the backlight, which can cover the reductions in optical characteristics of the thin polarizing film in an extremely satisfactory manner.

The polarizing film 110 is formed of a polyvinyl alcohol-based resin (hereinafter referred to as "PVA-based resin") membrane containing a dichromatic substance.

Examples of the dichromatic substance include iodine and an organic dye. They may be used alone or in combination. Of those, iodine is preferably used.

Any appropriate resin can be adopted as the PVA-based resin for forming the PVA-based resin layer. Examples of the resin include a polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically 85 mol % to 100 mol %, preferably 95.0 mol % to 99.95 mol %, more preferably 99.0 mol % to 99.93 mol %. The saponification degree can be determined in conformity with JIS K 6726-1994. The use of the PVA-based resin having such saponification degree can provide a polarizing film excellent in durability. When the saponification degree is excessively high, the resin may gel.

The average polymerization degree of the PVA-based resin can be appropriately selected depending on purposes. The average polymerization degree is typically 1,000 to 10,000, preferably 1,200 to 4,500, more preferably 1,500 to 4,300. It should be noted that the average polymerization degree can be determined in conformity with JIS K 6726-1994.

The polarizing film preferably shows absorption dichroism at any wavelength in the wavelength range of 380 nm to 780 nm. The polarization degree of the polarizing film at a single axis transmittance of 42% is preferably 99.0% or more, more preferably 99.9% or more.

A-3. Reflective Polarization Film

Figure 2:
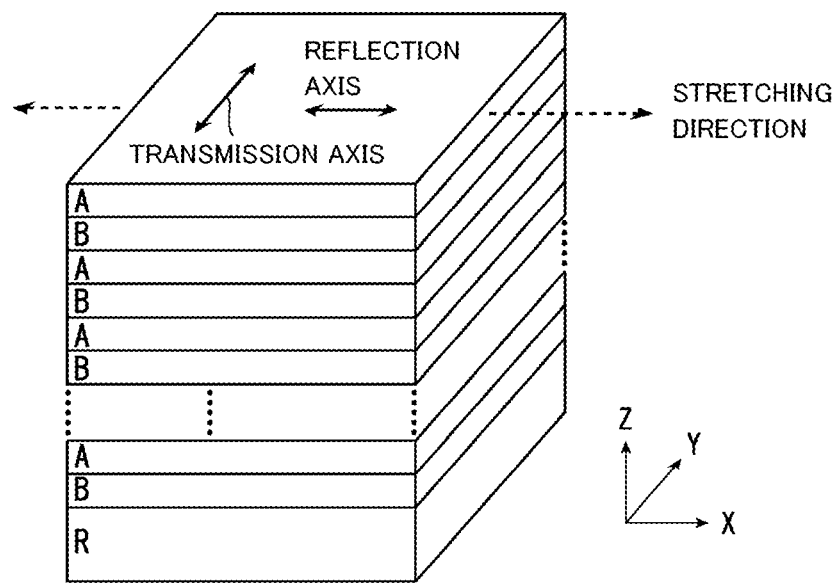
FIG. 2 is a schematic perspective view of an example of a reflective polarization film to be used in the present invention.

In the optical laminate of the present invention, combined use of the reflective polarization film and the polarizing film can improve the contrast of a display apparatus. The reflective polarization film 120 is typically, for example, a linearly polarized light separation-type reflective polarization film. FIG. 2 is a schematic perspective view of an example of the reflective polarization film to be used in the present invention. The reflective polarization film 120 is a multilayer laminate in which a layer A having birefringence and a layer B substantially free of birefringence are alternately laminated. For example, in the illustrated example, a refractive index nx in the x-axis direction of the layer A is larger than a refractive index ny in the y-axis direction of the layer, and a refractive index nx in the x-axis direction of the layer B and a refractive index ny in the y-axis direction of the layer B are substantially equal to each other. Therefore, a difference in refractive index between the layer A and the layer B is large in the x-axis direction and is substantially zero in the y-axis direction. As a result, the x-axis direction serves as a reflection axis and the y-axis direction serves as a transmission axis. The difference in refractive index between the layer A and the layer B in the x-axis direction is preferably 0.2 to 0.3. It should be noted that the x-axis direction corresponds to the stretching direction of the reflective polarization film in a production method (section A-5) to be described later.

The layer A is preferably formed of a material that expresses birefringence through stretching. Typical examples of such material include a naphthalene dicarboxylic acid polyester (such as polyethylene naphthalate), polycarbonate, and an acrylic resin (such as polymethyl methacrylate). Of those, polyethylene naphthalate is preferred. The layer B is preferably formed of a material that is substantially free of expressing birefringence even when stretched. A typical example of such material is a copolyester of naphthalene dicarboxylic acid and terephthalic acid.

The reflective polarization film transmits light having a first polarization direction (such as a p-wave) and reflects light having a second polarization direction perpendicular to the first polarization direction (such as an s-wave) at an interface between the layer A and the layer B. At the interface between the layer A and the layer B, part of the reflected light is transmitted as light having the first polarization direction and the other part thereof is reflected as light having the second polarization direction. Such reflection and transmission are repeated a plurality of times in the reflective polarization film. Thus, the utilization efficiency of light can be improved.

As illustrated in FIG. 2, the reflective polarization film 120 preferably includes a reflecting layer R as an outermost layer opposite to the polarizing film 110. When the reflecting layer R is provided, light that has finally returned to the outermost portion of the reflective polarization film without being utilized can be additionally utilized and hence the utilization efficiency of light can be additionally improved. The reflecting layer R typically expresses a reflecting function by virtue of the multilayer structure of a polyester resin layer.

The entire thickness of the reflective polarization film can be appropriately set depending on, for example, purposes and the total number of layers in the reflective polarization film. The entire thickness of the reflective polarization film is preferably 50 μm to 600 μm.

A film described in, for example, JP 09-507308 W can be used as the reflective polarization film.

A commercial product may be used as it is as the reflective polarization film 120 or the commercial product may be subjected to secondary processing (such as stretching) before use. The commercial product is, for example, a product available under the trade name "DBEF" from 3M Company.

A-4. Protective Film

In the optical laminate of the present invention, a protective film (not shown) may be placed on at least one side of the polarizing film. As a material for forming the protective film, there are given, for example: (meth)acrylic resins; cellulose-based resins such as diacetyl cellulose and triacetyl cellulose; olefin-based resins such as a cycloolefin-based resin and polypropylene; ester-based resins such as a polyethylene terephthalate-based resin; polyamide-based resins; polycarbonate-based resins; and copolymer resins thereof. It should be noted that a thermoplastic resin base material in the section C may be used as it is as the protective film.

The thickness of the protective film is preferably 20 μm to 100 μm. The protective film may be laminated on the polarizing film through an adhesion layer (specifically an adhesive layer or a pressure-sensitive adhesive layer), or may be laminated so as to be in close contact with the polarizing film (without through any adhesion layer). The adhesive layer is formed of any appropriate adhesive. The adhesive is, for example, a vinyl alcohol-based adhesive.

A-5. Method of Producing Optical Laminate
A-5-1. Method of Producing Polarizing Film The polarizing film 110 is produced by any appropriate method as long as the thickness can be satisfied. The polarizing film is typically produced by appropriately subjecting a PVA-based resin membrane to a treatment such as stretching or dyeing. For example, the PVA-based resin membrane may be a PVA-based resin film or may be a PVA-based resin layer formed on a base material.

A method for the stretching is, for example, fixed-end stretching involving using a tenter stretching machine, free-end stretching involving using rolls having different circumferential speeds, biaxial stretching involving using a simultaneous biaxial stretching machine, or sequential biaxial stretching. They may be adopted alone or in combination. For example, when the PVA-based resin membrane is stretched (subjected to free-end stretching) in a conveyance direction (MD: machine direction) by being passed through a gap between the rolls having different circumferential speeds, the stretching can be combined with, for example, stretching in a direction (TD: transverse direction) perpendicular to the conveyance direction. Hereinafter, a preferred embodiment is specifically described.

In a preferred embodiment, the polarizing film is produced by a method including the step of forming a PVA-based resin layer on a thermoplastic resin base material to produce a laminate (laminate-producing step) and the step of stretching the laminate (stretching step). Hereinafter, the respective steps are described.

(Laminate-Producing Step)

The laminate is produced by forming the PVA-based resin layer on the thermoplastic resin base material. The laminate is typically formed into a long shape.

The thermoplastic resin base material is of any appropriate construction as long as the base material can support the PVA-based resin layer and the polarizing film to be obtained from one side.

The thickness (before stretching) of the thermoplastic resin base material is preferably 50 μm to 250 μm. When the thickness is less than 50 μm, the base material may rupture at the time of its stretching. In addition, the base material becomes so thin after the stretching that it may become difficult to convey the base material. When the thickness exceeds 250 μm, an excessive load may be applied to a stretching machine. In addition, the conveyance may become difficult.

As a material for forming the thermoplastic resin base material, there are given, for example: ester-based resins such as a polyethylene terephthalate-based resin; olefin-based resins such as a cycloolefin-based resin and polypropylene; polyamide-based resins; polycarbonate-based resins; and copolymer resins thereof. Of those, a cycloolefin-based resin (such as a norbornene-based resin) and an amorphous polyethylene terephthalate-based resin are preferred. Specific examples of the amorphous polyethylene terephthalate-based resin include a copolymer further containing isophthalic acid as a dicarboxylic acid and a copolymer further containing cyclohexanedimethanol as a glycol.

The glass transition temperature (Tg) of the thermoplastic resin base material is preferably 170° C. or less. The use of such thermoplastic resin base material enables the stretching of the laminate at such a temperature that the crystallization of a PVA-based resin does not rapidly progress, and can suppress an inconvenience due to the crystallization (e.g., the inhibition of the orientation of the PVA-based resin layer by the stretching). It should be noted that the glass transition temperature (Tg) is a value determined in conformity with JIS K 7121.

The thermoplastic resin base material may be subjected to a surface modification treatment (such as a corona treatment) in advance, or an easy-adhesion layer may be formed on the thermoplastic resin base material. The performance of such treatment can improve adhesiveness between the thermoplastic resin base material and the PVA-based resin layer. It should be noted that the surface modification treatment and/or the formation of the easy-adhesion layer may be performed before the stretching or may be performed after the stretching.

Any appropriate method can be adopted as a method of forming the PVA-based resin layer. The PVA-based resin layer is preferably formed by applying an application liquid containing the PVA-based resin onto the thermoplastic resin base material and drying the liquid.

The application liquid is typically a solution prepared by dissolving the PVA-based resin in a solvent. Examples of the solvent include water, dimethylsulfoxide, dimethylformamide, dimethylacetamide, N-methylpyrrolidone, various glycols, polyhydric alcohols such as trimethylolpropane, and amines such as ethylenediamine and diethylenetriamine. The solvent can be used alone or in combination. Of those, water is preferred. The concentration of the PVA-based resin of the solution is preferably 3 parts by weight to 20 parts by weight with respect to 100 parts by weight of the solvent. At such resin concentration, a uniform coating film in close contact with the thermoplastic resin base material can be formed.

The application liquid may be compounded with an additive. Examples of the additive include a plasticizer and a surfactant. Examples of the plasticizer include polyhydric alcohols such as ethylene glycol and glycerin. Examples of the surfactant include nonionic surfactants. Such additive can be used for the purpose of additionally improving the uniformity, dyeing property, or stretchability of the PVA-based resin layer to be obtained.

Any appropriate method can be adopted as a method of applying the application liquid. Examples of the method include a roll coating method, a spin coating method, a wire bar coating method, a dip coating method, a die coating method, a curtain coating method, a spray coating method, and a knife coating method (comma coating method or the like).

The drying temperature is preferably equal to or less than the glass transition temperature (Tg) of the thermoplastic resin base material, more preferably equal to or less than Tg-20° C. Drying the liquid at such temperature prevents the thermoplastic resin base material from deforming before the formation of the PVA-based resin layer and hence can prevent the deterioration of the orientation property of the PVA-based resin layer to be obtained. Thus, the thermoplastic resin base material can satisfactorily deform together with the PVA-based resin layer, and hence the shrinkage and stretching of the laminate to be described later can be satisfactorily performed. As a result, good orientation property can be imparted to the PVA-based resin layer and hence a polarizing film having excellent optical characteristics can be obtained.

The thickness of the PVA-based resin layer can be set to any appropriate value depending on a desired polarizing film. In one embodiment, the thickness is preferably 20 μm or less, more preferably 5 μm to 15 μm. Even when the layer has such small thickness, the layer can be satisfactorily stretched by using the thermoplastic resin base material. As a result, a thin polarizing film suitable for the present invention can be satisfactorily obtained.

The moisture content of the PVA-based resin layer is preferably 20% or less, more preferably 15% or less.

(Stretching Step)

The stretching of the laminate may be performed in one stage, or may be performed in a plurality of stages. When the stretching is performed in a plurality of stages, the stretching ratio of the laminate to be described later is the product of stretching ratios in the respective stages.

The stretching temperature of the laminate can be set to any appropriate value depending on, for example, a formation material for the thermoplastic resin base material. When the in-air stretching mode is adopted, the stretching temperature is preferably equal to or higher than the glass transition temperature (Tg) of the thermoplastic resin base material, more preferably higher than the glass transition temperature (Tg) of the thermoplastic resin base material by 10° C. or more, particularly preferably higher than the Tg by 15° C. or more. Meanwhile, the stretching temperature of the laminate is preferably 170° C. or less. Performing the stretching at such temperature suppresses rapid progress of the crystallization of the PVA-based resin, thereby enabling the suppression of an inconvenience due to the crystallization (such as the inhibition of the orientation of the PVA-based resin layer by the stretching).

When the underwater stretching mode is adopted as a stretching mode, the stretching temperature is preferably 85° C. or less, more preferably 30° C. to 65° C. When the temperature exceeds 85° C., an inconvenience such as the elution of iodine caused to adsorb to the PVA-based resin or the elution of the PVA-based resin may occur, and hence the optical characteristics of the polarizing film to be obtained may be deteriorated. In this case, a thermoplastic resin base material that can be stretched even at such temperature is selected. An amorphous polyethylene terephthalate-based resin, olefin-based resin (such as polymethylpentene), or the like is preferably used as a formation material therefor.

When the underwater stretching mode is adopted, the laminate is preferably stretched by being immersed in an aqueous solution of boric acid. The use of the aqueous solution of boric acid can impart, to the PVA-based resin layer, rigidity enough to withstand a tension to be applied at the time of the stretching and such water resistance that the layer does not dissolve in water. Specifically, boric acid can produce a tetrahydroxyborate anion in the aqueous solution to cross-link with the PVA-based resin through a hydrogen bond, so that the rigidity and the water resistance can be imparted. As a result, a polarizing film having higher contrast ratio can be realized. The aqueous solution of boric acid is obtained by dissolving boric acid and/or borate in water as a solvent. The concentration of boric acid is usually 1 part by weight to 10 parts by weight with respect to 100 parts by weight of water. The immersion time of the laminate in the stretching bath is preferably approximately 15 seconds to 5 minutes.

In a preferred embodiment, the laminate is shrunk in a first direction and stretched in a second direction. When the laminate is shrunk in the first direction and stretched in the second direction, uniaxiality in the second direction is improved and hence excellent optical characteristics can be obtained. It should be noted that the second direction is substantially the absorption axis direction of the polarizing film to be obtained.

The shrinkage of the laminate may be performed simultaneously with the stretching, or the shrinkage and the stretching may be performed at different timings. In addition, the order in which the shrinkage and the stretching are performed is not limited, and the laminate may be shrunk in one stage or may be shrunk in a plurality of stages. In one embodiment, it is preferred that the laminate be stretched in the second direction after having been shrunk in the first direction. In another embodiment, it is preferred that the laminate be shrunk in the first direction while being stretched in the second direction. A method of shrinking the laminate separately from the stretching is preferably, for example, a method involving heating (thermally shrinking) the laminate. The heating temperature is preferably equal to or more than the glass transition temperature (Tg) of the thermoplastic resin base material.

The shrinking ratio of the laminate in the first direction is preferably 40% or less. With such shrinking ratio, excellent durability can be achieved. Meanwhile, the shrinking ratio is preferably 5% or more.

The second direction can be set to any appropriate direction depending on the polarizing film. The second direction and the first direction are preferably perpendicular to each other. Specifically, when the first direction is the conveyance direction (MD) of the thermoplastic resin base material, the second direction is preferably the direction (TD) perpendicular to the conveyance direction. When the first direction is the direction (TD) perpendicular to the conveyance direction, the second direction is preferably the conveyance direction (MD). The second direction is preferably the direction (TD) perpendicular to the conveyance direction. In this embodiment, the polarizing film to be obtained and the reflective polarization film can be attached to each other by a roll-to-roll process, and hence the efficiency with which the optical laminate is produced can be markedly improved.

Further, when the laminate is formed of a thermoplastic resin base material subjected to a stretching treatment in the first direction in advance, the thermoplastic resin base material can try to return to a state before the stretching by virtue of stretching in the second direction, heat, or the like, and hence the laminate can be shrunk in the first direction in an additionally uniform manner. Thus, excellent in-plane uniformity can be obtained even at a high shrinking ratio. In addition, the stretching ratio of the laminate in the second direction is preferably 4.0 times or more with respect to the original length of the laminate. Shrinking the laminate in the first direction enables stretching at such high ratio and hence can provide a polarizing film having excellent optical characteristics. Meanwhile, an upper limit for the stretching ratio in one-stage stretching is about 5.0 times. This is because the laminate may rupture.

In one embodiment, for example, the step of subjecting the laminate to in-air stretching at a high temperature (e.g., 95° C. or more) may be performed before the boric acid underwater stretching step and a dyeing step. Such in-air stretching step is hereinafter referred to as "in-air auxiliary stretching" because the step can be regarded as stretching preliminary or auxiliary to the boric acid underwater stretching.

When the in-air auxiliary stretching is combined with the boric acid underwater stretching, the laminate can be stretched at an additionally high ratio in some cases. As a result, a polarizing film having additionally excellent optical characteristics (such as a polarization degree) can be produced. For example, when a polyethylene terephthalate-based resin is used as the thermoplastic resin base material, the thermoplastic resin base material can be stretched favorably, while its orientation is suppressed, by a combination of the in-air auxiliary stretching and the boric acid underwater stretching than that in the case of the boric acid underwater stretching alone. As the orientation property of the thermoplastic resin base material is raised, its stretching tension increases and hence it becomes difficult to stably stretch the substrate or the thermoplastic resin base material ruptures. Accordingly, the laminate can be stretched at an additionally high ratio by stretching the thermoplastic resin base material while suppressing its orientation.

In addition, when the in-air auxiliary stretching is combined with the boric acid underwater stretching, the orientation property of the PVA-based resin is improved and hence the orientation property of the PVA-based resin can be improved even after the boric acid underwater stretching. Specifically, the orientation property of the PVA-based resin is improved in advance by the in-air auxiliary stretching so that the PVA-based resin may easily cross-link with boric acid during the boric acid underwater stretching. Then, the stretching is performed in a state where boric acid serves as a junction, and hence the orientation property of the PVA-based resin is assumed to be high even after the boric acid underwater stretching. As a result, a polarizing film having excellent optical characteristics (such as a polarization degree) can be produced.

A stretching method for the in-air auxiliary stretching may be fixed-end stretching or may be free-end stretching (such as a method involving passing the laminate through a gap between rolls having different circumferential speeds to uniaxially stretch the laminate). In addition, the stretching may be performed in one stage or may be performed in a plurality of stages. When the stretching is performed in a plurality of stages, a stretching ratio to be described later is the product of stretching ratios at the respective stages. It is preferred that a stretching direction in this step be substantially identical to the second direction.

The stretching ratio in the in-air auxiliary stretching is preferably 3.5 times or less. A stretching temperature in the in-air auxiliary stretching is preferably equal to or higher than the glass transition temperature of the PVA-based resin. The stretching temperature is preferably 95° C. to 150° C. It should be noted that the maximum stretching ratio when the in-air auxiliary stretching and the boric acid underwater stretching are combined with each other is preferably 5.0 times or more, more preferably 5.5 times or more, still more preferably 6.0 times or more with respect to the original length of the laminate.

(Other Treatments)

A treatment for producing the polarizing film except the stretching treatment is, for example, a dyeing treatment, an insolubilizing treatment, a cross-linking treatment, a washing treatment, or a drying treatment. Those treatments can each be performed at any appropriate timing.

The dyeing treatment is typically a treatment involving dyeing the PVA-based resin membrane with the dichromatic substance. The treatment is preferably performed by causing the dichromatic substance to adsorb to the PVA-based resin membrane. A method for the adsorption is, for example, a method involving immersing the PVA-based resin membrane (laminate) in a dyeing liquid containing the dichromatic substance, a method involving applying the dyeing liquid to the PVA-based resin membrane, or a method involving spraying the PVA-based resin membrane with the dyeing liquid. Of those, a method involving immersing the PVA-based resin membrane (laminate) in a dyeing liquid containing the dichromatic substance is preferred. This is because the dichromatic substance can satisfactorily adsorb to the membrane. It should be noted that both surfaces of the laminate may be immersed in the dyeing liquid or only one of the surfaces may be immersed.

When iodine is used as the dichromatic substance, the dyeing liquid is preferably an aqueous solution of iodine. The compounding amount of iodine is preferably 0.04 part by weight to 5.0 parts by weight with respect to 100 parts by weight of water. The aqueous solution of iodine is preferably compounded with an iodide salt in order that the solubility of iodine in water may be improved. Examples of the iodide salt include potassium iodide, lithium iodide, sodium iodide, zinc iodide, aluminum iodide, lead iodide, copper iodide, barium iodide, calcium iodide, tin iodide, and titanium iodide. Of those, potassium iodide and sodium iodide are preferred. The compounding amount of the iodide salt is preferably 0.3 part by weight to 15 parts by weight with respect to 100 parts by weight of water.

The liquid temperature of the dyeing liquid at the time of the dyeing is preferably 20° C. to 40° C. When the PVA-based resin membrane is immersed in the dyeing liquid, an immersion time is preferably 5 seconds to 300 seconds. Under such conditions, the dichromatic substance can be sufficiently caused to adsorb to the PVA-based resin membrane.

The insolubilizing treatment and cross-linking treatment are typically performed by immersing the PVA-based resin membrane in an aqueous solution of boric acid. The washing treatment is typically performed by immersing the PVA-based resin membrane in an aqueous solution of potassium iodide. A drying temperature in the drying treatment is preferably 30° C. to 100° C.

A-5-2. Method of Producing Reflective Polarization Film

The reflective polarization film can be typically produced by combining co-extrusion and transverse stretching. The co-extrusion can be performed by any appropriate system. For example, a feed block system may be adopted or a multi-manifold system may be adopted. For example, the material constituting the layer A and the material constituting the layer B are extruded in a feed block, and then the resultant is multilayered with a multiplier. It should be noted that such multilayering apparatus is known to a person skilled in the art. Next, the resultant multilayer laminate is typically stretched in the direction (TD) perpendicular to the conveyance direction. The material constituting the layer A (such as polyethylene naphthalate) is increased in refractive index only in the stretching direction by the transverse stretching, and as a result, expresses birefringence. The material constituting the layer B (such as a copolyester of naphthalene dicarboxylic acid and terephthalic acid) is not increased in refractive index in any direction even by the transverse stretching. As a result, a reflective polarization film having a reflection axis in the stretching direction (TD) and having a transmission axis in the conveyance direction (MD) can be obtained (the TD corresponds to the x-axis direction of FIG. 2 and the MD corresponds to the y-axis direction of the figure). It should be noted that a stretching operation can be performed with any appropriate apparatus.

A-5-3. Method of Producing Optical Laminate

The optical laminate of the present invention is obtained by laminating the polarizing film obtained in the section A-5-1 and the reflective polarization film obtained in the section A-5-2 by any appropriate method. The polarizing film and the reflective polarization film are typically attached to each other through an adhesion layer (typically an adhesive layer or a pressure-sensitive adhesive layer). As described above, in an embodiment in which the polarizing film has an absorption axis in the TD, the polarizing film and the reflective polarization film can be attached to each other by a roll-to-roll process.

B. Optical Laminate Set

An optical laminate set of the present invention includes the optical laminate described in the section A (first optical laminate) and a second optical laminate including a polarizing film having a thickness larger than the thickness of the polarizing film of the first optical laminate by 5 µm or more. It should be noted that the second optical laminate may be formed of a polarizing film alone, though the laminate is called the second optical "laminate" for convenience. Practically, a protective film is provided on at least one side of the polarizing film of the second optical laminate. Any appropriate polarizing film can be adopted as the polarizing film as long as the condition for the thickness is satisfied. Specific examples thereof include polarizing films conforming to the polarizing films described in the section A-2 and the section A-5-1, and a PVA-based film is preferably used as the PVA-based resin membrane. Any appropriate film can be adopted as the protective film. A typical example thereof is the protective film described in the section A-4. Typically, the first optical laminate is placed on a side opposite to the viewer side of a liquid crystal cell and the second optical laminate is placed on the viewer side of the liquid crystal cell. The use of such optical laminate set in such positional relationship can suppress the warping of a liquid crystal panel in an extremely satisfactory manner.

A difference between the thickness of the polarizing film of the second optical laminate and the thickness of the polarizing film of the first optical laminate is preferably 10 µm or more. Meanwhile, the thickness difference is preferably 30 µm or less. When the thickness difference exceeds 30 µm, the warping of the liquid crystal panel resulting from the thickness difference (in this case, the warping of a convex to the side opposite to the viewer side) may occur. The thickness of the polarizing film of the second optical laminate is preferably 15 µm or more, more preferably 18 µm or more. The thickness of the polarizing film of the second optical laminate is preferably 30 µm or less. When the thickness of the polarizing film of the second optical laminate falls within such range, the difference between the thickness of the polarizing film of the second optical laminate and the thickness of the polarizing film of the first optical laminate can be easily set within a desired range.

C. Liquid Crystal Panel

C-1. Entire Construction of Liquid Crystal Panel

Figure 3:
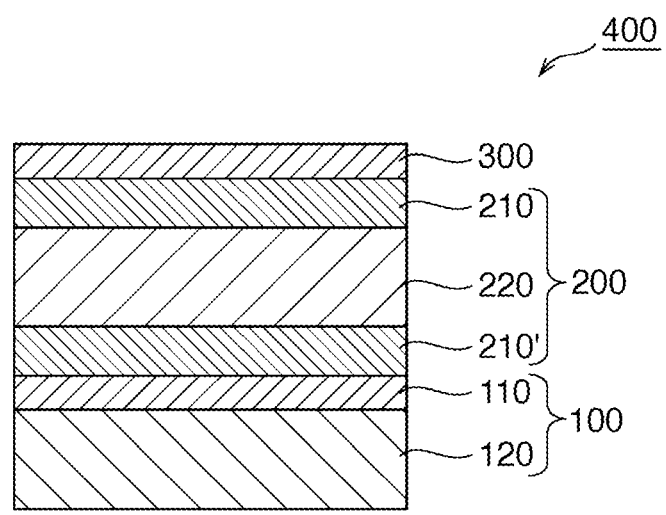
FIG. 3 is a schematic sectional view of a liquid crystal panel according to one embodiment of the present invention.

FIG. 3 is a schematic sectional view of a liquid crystal panel according to a preferred embodiment of the present invention. A liquid crystal panel 400 has a liquid crystal cell 200, a second optical laminate 300 placed on the viewer side of the liquid crystal cell 200, and the optical laminate 100 of the present invention placed on a side opposite to the viewer side of the liquid crystal cell 200. The optical laminate 100 of the present invention is placed on the side opposite to the viewer side of the liquid crystal cell. As described above, practically, the optical laminate 100 of the present invention is provided with a protective film on at least one side of its polarizing film and placed so that the polarizing film 110 may be on a liquid crystal cell side. Practically, the second optical laminate is also provided with a protective film on at least one side of its polarizing film and placed so that the polarizing film may be on the liquid crystal cell side (not shown). In the liquid crystal panel 400, the absorption axis of the polarizing film of the second optical laminate 300 and the absorption axis of the polarizing film 110 of the optical laminate 100 are perpendicular to each other. As a result, the absorption axis (stretching axis) of the polarizing film of the second optical laminate 300 and the reflection axis (stretching axis) of the reflective polarization film 120 of the optical laminate 100 are perpendicular to each other. The liquid crystal panel 400 may further have any appropriate optical member, though the member is not shown. Examples of the optical member include a protective film and a retardation film.

C-2. Liquid Crystal Cell

The liquid crystal cell 200 has a pair of substrates 210 and 210', and a liquid crystal layer 220 as a display medium sandwiched between the substrates 210 and 210'. One of the substrates (color filter substrate) is provided with a color filter and a black matrix (none of them is shown). The other substrate (active matrix substrate) is provided with a switching element (typically a TFT) (not shown) for controlling the electrooptical characteristics of a liquid crystal, and a scanning line (not shown) for providing the switching element with a gate signal and a signal line (not shown) for providing the element with a source signal. It should be noted that the color filter may be provided on an active matrix substrate side. A gap between the substrates 210 and 210' (cell gap) is controlled by a spacer (not shown). An alignment film (not shown) formed of, for example, polyimide is provided on the side of each of the substrates 210 and 210' to be brought into contact with the liquid crystal layer 220.

Any appropriate driving mode can be adopted as the driving mode of the liquid crystal cell. Specific examples of the driving mode include a super twisted nematic (STN) mode, a twisted nematic (TN) mode, an in-plane switching (IPS) mode, a vertical aligned (VA) mode, an optically aligned birefringence (OCB) mode, a hybrid aligned nematic (HAN) mode, an axially symmetric aligned microcell (ASM) mode, and an electrically controlled birefringence (ECB) mode.

EXAMPLES

Hereinafter, the present invention is specifically described by way of examples. However, the present invention is not limited to these examples. Evaluation methods in the examples are as described below. In addition, the terms "part(s)" and "%" in the examples refer to "part(s) by weight" and "wt %," respectively unless otherwise stated.

(1) Warping Amount of Liquid Crystal Panel

A liquid crystal panel obtained in each of examples and comparative examples was loaded into an oven at 80° C. for 24 hours. The liquid crystal panel was taken out of the oven, and 1 hour after that, its warping amount was measured. The warping amount was evaluated as follows: the liquid crystal panel to be subjected to the measurement was mounted on a glass plate so that its convex surface was on a lower side, the height of each of the four corners of the liquid crystal panel from the glass plate was measured, and the largest value out of the values for the four corners was used in the evaluation. In this example, the warping of a convex to a side opposite to a viewer side is represented as + and the warping of the convex to the viewer side is represented as −.

(2) Panel Contrast

The luminances of the black display and white display of the liquid crystal panel obtained in each of the examples and comparative examples were measured with a BM-5 (manufactured by TOPCON CORPORATION), and then a ratio therebetween (white luminance/black luminance) was calculated.

(3) Transmittance

The single axis transmittance (Ts), parallel transmittance (Tp), and crossed transmittance (Tc) of a thin polarizing film were measured with a UV-visible spectrophotometer (manufactured by JASCO Corporation, product name "V7100"). It should be noted that the Ts, Tp, and Tc are each a Y value obtained through measurement with the two-degree field of view (C-light source) of JIS Z 8701 and color correction.

Reference Example 1

Production of Laminate (Thermoplastic Resin Base Material)
A cycloolefin-based resin film (manufactured by JSR Corporation, trade name "ARTON") that was of a long shape, and had a thickness of 200 μm and a Tg of 123° C. was used as a thermoplastic resin base material.
(Preparation of Application Liquid)
A polyvinyl alcohol (PVA) resin having a polymerization degree of 1,800 and a saponification degree of 98 to 99% (manufactured by The Nippon Synthetic Chemical Industry Co., Ltd., trade name "Gohsenol (trademark) NH-18") was dissolved in water to prepare an aqueous solution of a polyvinyl alcohol having a concentration of 7 wt %.
(Formation of PVA-Based Resin Layer)
The application liquid was applied to one surface of the thermoplastic resin base material with a die coater (die coating method), and was then dried at 100° C. for 180 seconds to form a PVA-based resin layer having a thickness of 11 μm. Thus, a long laminate was produced.
<Stretching Treatment>
The resultant long laminate was subjected to in-air stretching with a tenter stretching machine at 140° C. in a direction perpendicular to the lengthwise direction of the laminate by 4.5 times.
<Dyeing Treatment>
Next, the laminate was immersed in an aqueous solution of iodine at 25° C. (iodine concentration: 0.5 wt %, potassium iodide concentration: 10 wt %) for 30 seconds.
<Cross-Linking Treatment>
The laminate after the dyeing was immersed in an aqueous solution of boric acid at 60° C. (boric acid concentration: 5 wt %, potassium iodide concentration: 5 wt %) for 60 seconds.

<Washing Treatment>
After the cross-linking treatment, the laminate was immersed in an aqueous solution of potassium iodide at 25° C. (potassium iodide concentration: 5 wt %) for 5 seconds.
Thus, a polarizing film having a thickness of 2 μm was produced on the thermoplastic resin base material (single axis transmittance (Ts) of the polarizing film: 41%).
<Transfer of Polarizing Film>
A protective film (TAC film manufactured by Fujifilm Corporation, trade name "FUJITAC," thickness: 40 μm) was attached to the polarizing film side of the laminate through a vinyl alcohol-based adhesive. Further, the thermoplastic resin base material was peeled from the laminate and then the same protective film was attached to the side of the polarizing film from which the thermoplastic resin base material had been peeled. Thus, a polarization film 1 was produced.

Reference Example 2

Production of Laminate (Thermoplastic Resin Base Material)
An isophthalic acid-copolymerized polyethylene terephthalate film having a Tg of 75° C. obtained by copolymerizing a polyethylene terephthalate with 6 mol % of isophthalic acid (thickness: 200 μm) was used as a thermoplastic resin base material.
(Preparation of Application Liquid)
A polyvinyl alcohol (PVA) resin having a polymerization degree of 2,600 and a saponification degree of 99.9% (manufactured by The Nippon Synthetic Chemical Industry Co., Ltd., trade name "Gohsenol (trademark) NH-26") was dissolved in water to prepare an aqueous solution of a polyvinyl alcohol having a concentration of 7 wt %.
(Formation of PVA-Based Resin Layer)
The application liquid was applied to one surface of the thermoplastic resin base material with a die coater (die coating method), and was then dried at 60° C. for 300 seconds to form a PVA-based resin layer having a thickness of 10 μm. Thus, a long laminate was produced.
<In-Air Auxiliary Stretching Treatment>
The resultant long laminate was subjected to free-end uniaxial stretching in its longitudinal direction (lengthwise direction) by 1.8 times between rolls having different circumferential speeds in an oven at 130° C.
<Insolubilizing Treatment>
After that, the laminate was immersed in an insolubilizing bath having a liquid temperature of 30° C. (an aqueous solution of boric acid obtained by compounding 100 parts by weight of water with 3 parts by weight of boric acid) for 30 seconds.
<Dyeing Treatment>
Next, the laminate was immersed in a dyeing bath having a liquid temperature of 30° C. (an aqueous solution of iodine obtained by compounding 100 parts by weight of water with 0.2 part by weight of iodine and 1.4 parts by weight of potassium iodide) so that the single axis transmittance (Ts) of a thin polarizing film to be finally obtained became 41%.
<Cross-Linking Treatment>
Next, the laminate was immersed in a cross-linking bath having a liquid temperature of 30° C. (an aqueous solution of boric acid obtained by compounding 100 parts by weight of water with 3 parts by weight of potassium iodide and 3 parts by weight of boric acid) for 60 seconds.
<Boric Acid Underwater Stretching Treatment>
After that, the laminate was subjected to uniaxial stretching in its longitudinal direction (lengthwise direction) between rolls having different circumferential speeds while being immersed in an aqueous solution of boric acid having a liquid temperature of 70° C. (an aqueous solution obtained by compounding 100 parts by weight of water with 5 parts by weight of boric acid and 5 parts by weight of potassium iodide). Thus, an optical film laminate was obtained. A stretching ratio in the boric acid underwater stretching treatment was set to 3.3 times and a total stretching ratio was 6.0 times.

<Washing and Drying Treatments>

After that, the optical film laminate was immersed in a washing bath (an aqueous solution obtained by compounding 100 parts by weight of water with 3 parts by weight of potassium iodide), and was then dried with hot air at 60° C.

Thus, a polarizing film having a thickness of 4.5 μm was obtained on the thermoplastic resin base material.

<Transfer of Polarizing Film>

A protective film (TAC film manufactured by Fujifilm Corporation, trade name "FUJITAC," thickness: 40 μm) was attached to the polarizing film side of the laminate through a vinyl alcohol-based adhesive. Further, the thermoplastic resin base material was peeled from the laminate and then the same protective film was attached to the side of the polarizing film from which the thermoplastic resin base material had been peeled. Thus, a polarization film 2 was produced.

Reference Example 3

A polyvinyl alcohol film having a thickness of 75 μm was swollen by being immersed in hot water at 28° C. for 60 seconds. Next, the film was dyed by being immersed in an aqueous solution containing iodine and potassium iodide (at a weight ratio of 1:10) so as to have a predetermined single axis transmittance while being stretched by up to 3.3 times. After that, the film was immersed in an aqueous solution containing 3 wt % of boric acid and 2 wt % of potassium iodide for 10 seconds, and was then stretched in an aqueous solution at 60° C. containing 4 wt % of boric acid and 3 wt % of potassium iodide so that a total stretching ratio became 6.0 times. After that, the resultant stretched film was immersed in an aqueous solution containing 5 wt % of potassium iodide for 10 seconds and then dried in an oven at 40° C. for 3 minutes to provide a polarizing film having a thickness of 20 μm. A protective film (TAC film manufactured by Fujifilm Corporation, trade name "FUJITAC," thickness: 40 μm) was attached to each of both sides of the polarizing film through a vinyl alcohol-based adhesive to provide a polarization film 3.

Example 1

Production of Optical Laminate

The polarization film 1 obtained in Reference Example 1 and a commercial reflective polarization film (manufactured by 3M Company, trade name "DBEF," thickness: 100 μm) were attached to each other through a vinyl alcohol-based adhesive by a roll-to-roll process to provide an optical laminate 1. The attachment was performed so that the transmission axis of the polarizing film and the transmission axis of the reflective polarization film were parallel to each other.

Example 2

Production of Optical Laminate

An optical laminate 2 was obtained in the same manner as in Example 1 except that the polarization film 2 obtained in Reference Example 2 was used.

Comparative Example 1

An optical laminate 3 was obtained in the same manner as in Example 1 except that the polarization film 3 obtained in Reference Example 3 was used.

Example 3

Production of Liquid Crystal Panel

An optical laminate on a side opposite to the viewer side of a liquid crystal panel (manufactured by Sharp Corporation, VA mode, panel size: 400 mm×220 mm) was removed and then the optical laminate 1 was mounted on a liquid crystal cell. Next, an optical laminate on the viewer side was removed and then the polarization film 3 was mounted on the liquid crystal cell. Here, the mounting was performed so that the absorption axis of the polarizing film of the optical laminate 1 and the absorption axis of the polarizing film of the polarization film 3 were substantially perpendicular to each other. Thus, a liquid crystal panel was produced. The liquid crystal panel was subjected to the evaluations (1) and (2). Table 1 shows the results of the evaluations together with the results of Example 4, Comparative Examples 2 and 3, and Reference Example 4 to be described later.

TABLE 1

| | Polarizing film on viewer side (polarizing film thickness: μm) | Polarizing film on opposite side (polarizing film thickness: μm) | Reflective polarization film | Warping amount (mm) | Panel contrast |
|---|---|---|---|---|---|
| Example 3 | Polarization film 3 (20 μm) | Optical laminate 1 (2 μm) | Present | −0.01 | 4,600 |
| Example 4 | Polarization film 3 (20 μm) | Optical laminate 2 (4.5 μm) | Present | −0.08 | 4,600 |
| Comparative Example 2 | Polarization film 3 (20 μm) | Optical laminate 3 (20 μm) | Present | −0.83 | 4,600 |
| Comparative Example 3 | Polarization film 1 (2 μm) | Optical laminate 3 (20 μm) | Present | −2.20 | 1,700 |
| Reference Example 4 | Polarization film 1 (2 μm) | Optical laminate 1 (2 μm) | Present | −0.82 | 1,000 |

Example 4, Comparative Examples 2 and 3, and Reference Example 4

Liquid crystal panels were produced in the same manner as in Example 3 except that members were used in such combinations as shown in Table 1 above. The resultant liquid crystal panels were subjected to the same evaluations as those of Example 3. Table 1 shows the results of the evaluations.

As is apparent from Table 1, a liquid crystal panel in which the optical laminate of the present invention is placed on a side opposite to a viewer side and a relatively thick polarizing film is placed on the viewer side (in other words, a liquid crystal panel in which the optical laminate set of the present invention is placed) shows extremely small warping and has high contrast.

INDUSTRIAL APPLICABILITY

The optical laminate and liquid crystal panel of the present invention can be suitably used in a liquid crystal display apparatus.

REFERENCE SIGNS LIST 100 optical laminate (first optical laminate)
110 polarizing film
120 reflective polarization film
200 liquid crystal cell
300 second optical laminate
400 liquid crystal panel

The invention claimed is:

1. An optical laminate set, comprising:
a first optical laminate including a first polarizing film having a thickness of 10 μm or less; and a reflective polarization film; and
a second optical laminate including a second polarizing film having a thickness larger than the thickness of the first polarizing film of the first optical laminate by 5 micrometer or more;
wherein the second optical laminate is placeable on a viewer side of a liquid crystal panel and the first optical laminate is placeable on a side opposite to the viewer side.

2. The optical laminate set according to claim 1, wherein the first polarizing film is obtained by transverse stretching.

3. A liquid crystal panel, comprising:
a liquid crystal cell; and
the optical laminate set according to claim 1;
wherein the second optical laminate of the optical laminate set is placed on a viewer side and the first optical laminate is placed on a side opposite to the viewer side.

4. The optical laminate set according to claim 1, wherein the first polarizing film is bonded directly to the reflective polarizing film.

5. The optical laminate set according to claim 1, wherein the first polarizing film is bonded to the reflective polarizing film via an adhesive layer.

6. The optical laminate set according to claim 1, wherein the transmission axis of the first polarizing film is substantially parallel to the transmission axis of the reflective polarizing film.

7. The optical laminate set according to claim 1, wherein the first polarizing film has a thickness of 1 μm to 7 μm.

8. The optical laminate set according to claim 7, wherein the first polarizing film has a thickness of 1 μm to 5 μm.

9. The optical laminate set according to claim 1, wherein the reflective polarizing film is a multilayer laminate comprising a layer A having a birefringence and a layer B substantially free of birefringence,
wherein the layer A and the layer B are alternately laminated.

10. The optical laminate set according to claim 1, wherein the reflective polarizing film comprises a reflecting layer, which is the outermost layer and is formed opposite to the first polarizing film.

11. A liquid crystal panel, comprising:
a liquid crystal cell; and
the optical laminate set according to claim 10.

12. The optical laminate set according to claim 1, wherein the reflective polarizing film has a thickness of 50 μm to 600 μm.

13. The optical laminate set according to claim 1, further comprising a protective film formed on a side of the second polarizing film.

14. The optical laminate set according to claim 13, wherein the protective film has a thickness of 20 μm to 100 μm.

15. A liquid crystal panel, comprising:
a liquid crystal cell; and
the optical laminate set according to claim 13.

* * * * *